Jan. 30, 1934. J. M. PERKINS 1,945,328
METHOD OF DISPOSING OF NUISANCE LIQUIDS
Filed March 2, 1933
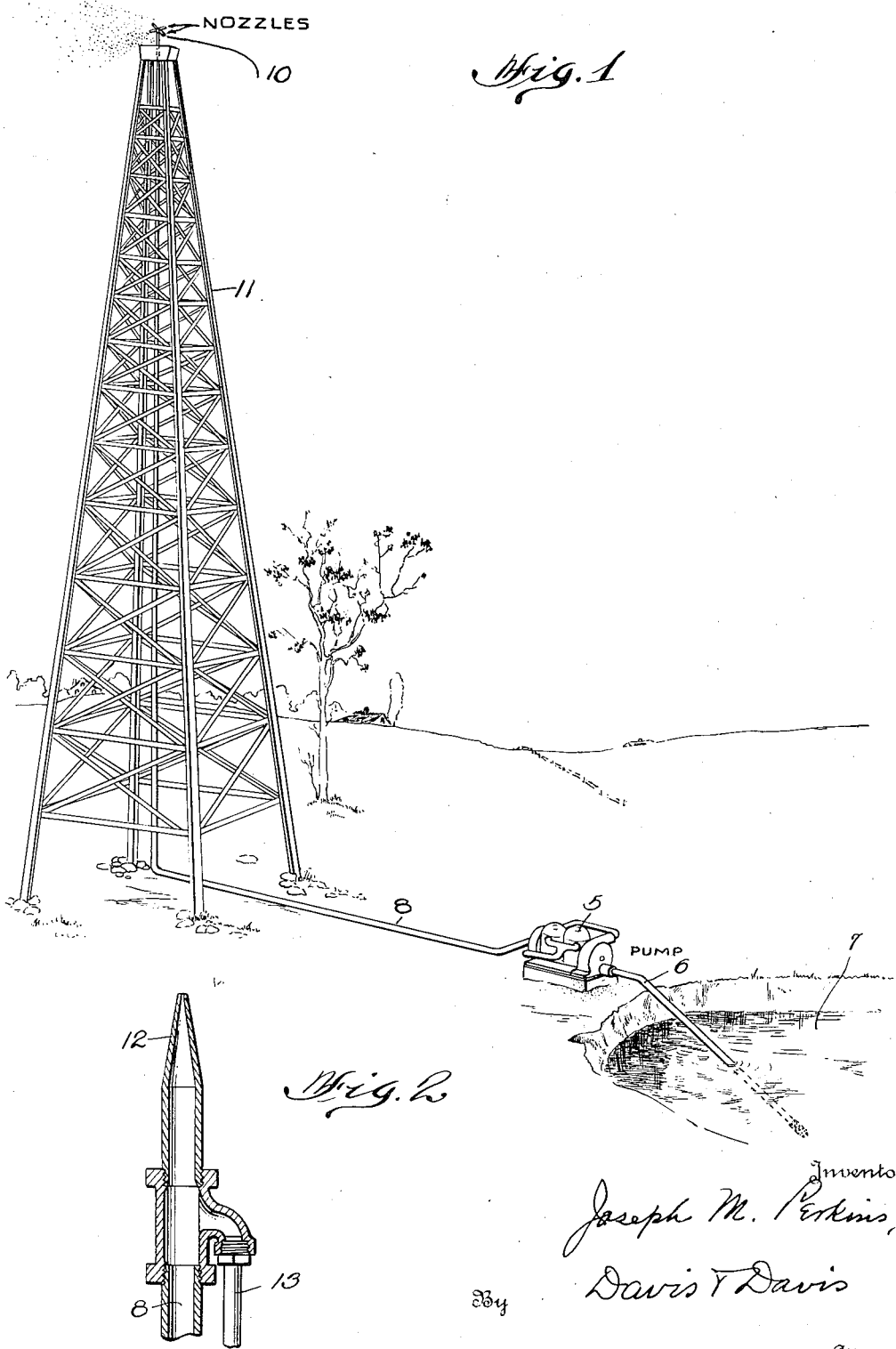

Patented Jan. 30, 1934

1,945,328

UNITED STATES PATENT OFFICE 1,945,328

METHOD OF DISPOSING OF NUISANCE LIQUIDS

Joseph M. Perkins, Eastland, Tex.

Application March 2, 1933. Serial No. 659,427

1 Claim. (Cl. 299—1)

The object of this invention is to harmlessly dispose of those liquids and liquors which result from industrial processes and which are troublesome or uneconomical to dispose of in the ordinary ways, namely by running them into ponds or streams, or evaporating them. My particular object is to provide a method for disposing of the salt water that in many cases is a product of oil-well operations. The harmless disposal of this brine water is a serious problem since it is against the laws of many States to dispose of this water in any manner which results in polluting adjacent running water, or wells, or vegetation.

In accordance with my method, the nuisance liquid is pumped under pressure to an elevated point and there atomized or sprayed into a fog-like mist of such fineness that the natural currents of air will carry the mist away from the point of production and spread it over such wide and distant areas that it will be no more harmful than for instance is the salt that is deposited on land areas by an in-shore breeze from a salt water body, as more fully hereinafter set forth. In the drawing:—

Fig. 1 is a diagram of an apparatus for carrying out my method; and

Fig. 2 is a detail view of another form of mist making device.

In the drawing, 5 is a pump of any suitable type whose inlet pipe 6 leads to the pond 7 or other receptacle containing the nuisance-liquor to be disposed of. The outlet pipe 8 of the pump is carried to an elevated point and at its upper end is provided with a nozzle system or arrangement 10 of such character as to spray the liquid into a mist or fog. In the present instance this pipe 8 is supported on an oil derrick 11. Any mist making nozzle or other device may be employed. In Fig. 1 I have illustrated an ordinary nozzle with the usual fine orifices, which owing to the pressure in the pipe 8 will fog the liquor to a sufficient degree of fineness to be buoyant enough to be carried away by natural air currents. In Fig. 2 I show an ordinary atomizer nozzle 12 which with the assistance of air under pressure brought to its through pipe 13 from a suitable pump, will finely comminute the liquid and send it into the atmosphere under the desired degree of pressure. When brine water is handled it will be understood of course, that the pump and pipes are to be protected from chemical reaction, and in handling other liquors also it will be understood that wherever necessary, such precautions will be taken.

It will be observed that my idea is to carry the nuisance liquid to an elevated point in the atmosphere and there reduce it to a fog-like condition so that the natural currents of air will carry the mist thus produced to long distances and over wide areas, so that when the objectionable substance or substances in the liquid finally reach the earth they will have been so disseminated as to be harmless to plant and animal life as well as to bodies of water and will probably be invisible. I believe that a pressure of between 350 and 400 lbs. to the square inch will be sufficient to comminute the liquid into a bouyant mist. There may of course be climatic conditions which might cause the artificial fog my process produces to be deposited upon the earth within so small an area as to require that the operation shall be temporarily discontinued, but I am sure that the periods of time during which my method can be operated with success would be sufficient to render it entirely economical in operation.

It will be understood that the apparatus may be operated either manually or automatically and further that it will probably not be desirable to carry on the method in the absence of a wind sufficiently strong to carry away the mist.

I claim:

The method herein described of disposing of nuisance brines consisting in forcing the entire body of liquid to be disposed of to an elevated point and there sufficiently comminuting all the liquid to produce a fog-like buoyant mist which will be carried away by the prevailing natural air currents.

JOSEPH M. PERKINS.